May 23, 1944.  M. BEIBIN  2,349,402
DEODORANT AND MOTH PREVENTING CAKE
Filed Sept. 29, 1942
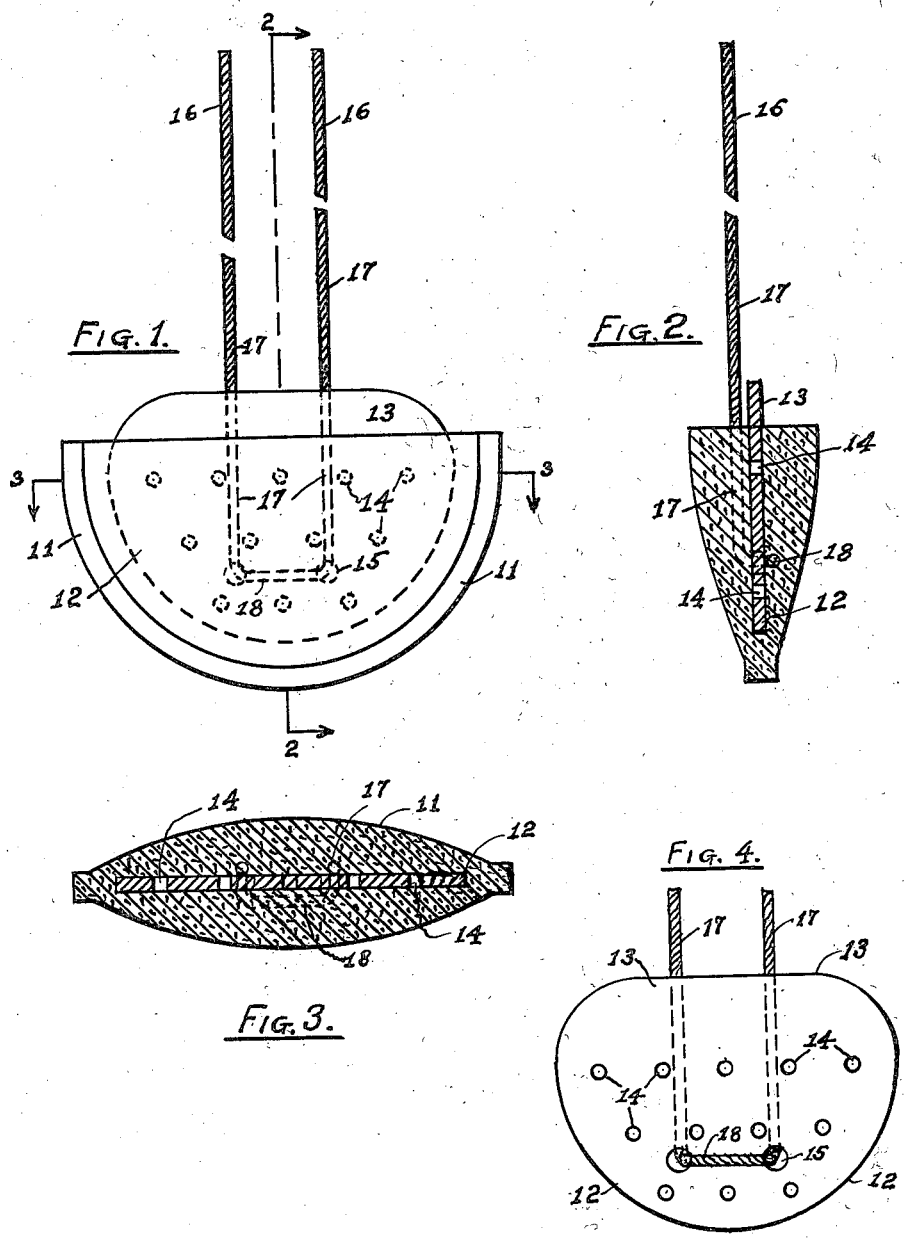
INVENTOR:
Morris Beibin,
BY Israel Benjamins,
ATTORNEY.

Patented May 23, 1944

2,349,402

UNITED STATES PATENT OFFICE 2,349,402

DEODORANT AND MOTH PREVENTING CAKE

Morris Beibin, Brooklyn, N. Y.

Application September 29, 1942, Serial No. 460,177

1 Claim. (Cl. 299—24)

My invention relates to improvements in deodorant and moth preventing cakes, and it consists in the novel features which are hereinafter more fully described.

One of the objects of my invention is to provide an adequate and preferably non-metallic rigid reinforcing member for a deodorant and moth preventing cake.

These cakes may be made by compressing a deodorant and disinfecting powder, such as naphthaline or paradichlorobenzine, or in any other suitable manner.

This cake is liable to crack or break and crumble; I, therefore, provide a rigid reinforcing member, which is preferably non-metallic, to keep the body of the cake from being broken.

Another object of my invention is to combine with the said reinforcing member a suitable, preferably non-metallic flexible suspending means, which may consist of a cord or fabric band, whereby metal may be eliminated from the construction of the deodorant and moth preventing cake and the cost of it may be reduced.

A further object is to prevent the clogging of plumbing fixtures by disconnected deodorant cakes or loosened metal suspending means of the same.

A still other object is to have the said rigid reinforcing member serve also as a means for introducing parts of the said flexible suspending means into the body of the deodorant and moth preventing cake during the operation of molding the cake from powder, as hereinbefore described.

Another object is to have my above reinforcing member and suspending means for deodorant and moth preventing cakes simple, durable and inexpensive.

Other objects and advantages will hereinafter appear.

I attain these objects by the deodorant and moth preventing cake with the reinforcing member and suspending means thereof, one form of which is illustrated in the accompanying drawing or by any mechanical equivalent or obvious modifications of the same.

In the drawing:

Fig. 1 is a fragmentary side view in elevation of my improved deodorant and moth preventing cake with the suspending means thereof shown as anchored therein.

Fig. 2 is a section on the line 2—2 of Fig. 1, looking in the direction of the arrows; and Fig. 3 is a section on the line 3—3 of Fig. 1, looking in the direction of the arrows.

Fig. 4 is a detail view in side elevation of the reinforcing member and suspension means which are hereinafter described.

Similar numerals refer to similar parts throughout the several views of the drawing.

11 designates the main body of my deodorant and moth preventing cake, which may be formed as hereinbefore described.

To keep the cake 11 from disintegrating I provide a reinforcing member such as 12 in Figs. 2 and 3, which may consist preferably of a plate of non-metallic material, such as cardboard or pasteboard.

The plate 12 is shown as having thereon a portion 13 extending from the body 11 of the deodorant and moth preventing cake, to serve as a handle for inserting the plate 12 into the material of which the body 11 of the cake is formed during the operation of molding the same.

The plate 12 is also shown as having therein apertures 14 for anchoring therein the material of the body 11 of the cake and a pair of larger openings 15 for passing therethrough the ends 16 of a cord or fabric band 17 in a way to retain an intermediate part 18 of the band 17 on one side of the plate 12 intermediate said openings 15 when the plate 12 is being inserted into the material of the body 11 of the cake as hereinbefore described; the ends 16 and the greater part of the length of the band 17 are arranged to extend from the body 11 of the cake to serve as a means for suspending the cake from a desired object.

The band 17 is shown as having portions thereof removed to indicate that it may have any desired length.

Instead of the opening 15, slots may be used, and the plate 12 may also be made of metal, if desired; the flexible suspending means 17 may also be made of metal, if desired, although it is more advantageous to make them of non-metallic material.

Other variations are possible and parts of my invention may be used without other parts.

I do not, therefore, restrict myself to the details as shown.

I claim as my invention and desire to secure by Letters Patent:

In a deodorant and moth preventing cake, a reinforcing and anchoring member in said cake, openings in a part of said member located within said cake and flexible suspending means having therein a loop portion, each of the legs of said portion extending through one of said openings, said suspending means thereby being in engagement with said member interiorly of said cake, whereby said flexible means may have the inner portion thereof introduced by means of said member into said cake to be anchored therein.

MORRIS BEIBIN.